United States Patent
Patel et al.

(10) Patent No.: US 12,507,899 B2
(45) Date of Patent: Dec. 30, 2025

(54) SYSTEMS AND METHODS FOR VASCULAR DISEASE PREDICTION, INDICATION, OR DIAGNOSIS

(71) Applicants: Savan Patel, Belle Mead, NJ (US); Adarsh Rao, Skillman, NJ (US)

(72) Inventors: Savan Patel, Belle Mead, NJ (US); Adarsh Rao, Skillman, NJ (US)

( * ) Notice: Subject to any disclaimer, the term of this patent is extended or adjusted under 35 U.S.C. 154(b) by 0 days.

(21) Appl. No.: 17/114,189

(22) Filed: Dec. 7, 2020

(65) Prior Publication Data

US 2021/0169355 A1 Jun. 10, 2021

Related U.S. Application Data

(60) Provisional application No. 62/945,025, filed on Dec. 6, 2019.

(51) Int. Cl.
*A61B 5/021* (2006.01)
*A61B 5/00* (2006.01)
*A61B 5/026* (2006.01)

(52) U.S. Cl.
CPC ........ *A61B 5/02141* (2013.01); *A61B 5/0004* (2013.01); *A61B 5/0261* (2013.01); *A61B 5/7203* (2013.01); *A61B 2562/0219* (2013.01)

(58) Field of Classification Search
CPC . A61B 5/02141; A61B 5/0004; A61B 5/7203; A61B 5/0261; A61B 2562/0219
See application file for complete search history.

(56) References Cited

U.S. PATENT DOCUMENTS

| | | | | |
|---|---|---|---|---|
| 5,140,990 A | * | 8/1992 | Jones | A61B 5/021 600/480 |
| 5,730,136 A | * | 3/1998 | Laufer | A61B 8/40 600/504 |
| 5,991,654 A | * | 11/1999 | Tumey | A61B 5/01 128/925 |
| 6,017,307 A | * | 1/2000 | Raines | G16H 10/20 600/300 |
| 11,232,866 B1 | * | 1/2022 | Peters | A61B 5/7275 |
| 2003/0176815 A1 | * | 9/2003 | Baba | A61B 5/7475 600/595 |
| 2005/0171443 A1 | * | 8/2005 | Gorenberg | A61B 5/02141 600/490 |
| 2008/0103397 A1 | * | 5/2008 | Barak | A61B 5/0285 600/492 |
| 2008/0146892 A1 | * | 6/2008 | LeBoeuf | A61B 5/02 600/300 |
| 2009/0048525 A1 | * | 2/2009 | Rogers | A61B 5/02007 600/504 |
| 2010/0016734 A1 | * | 1/2010 | Sethi | A61B 5/02108 600/485 |
| 2013/0131475 A1 | * | 5/2013 | Eisen | A61B 5/7207 600/324 |

(Continued)

*Primary Examiner* — Abid A Mustansir
(74) *Attorney, Agent, or Firm* — Vikas P. Shah

(57) ABSTRACT

According to one implementation of the present disclosure, a method for prediction, indication, or diagnosis of vascular disease. The method includes the alignment of respective one or more recording devices to portions of one or more limbs. It further includes obtaining, at periodic intervals, blood flow data from respective one or more vessels of the one or more limbs as well as determining one or more metrics based on the obtained blood flow data.

19 Claims, 13 Drawing Sheets

(56) References Cited

U.S. PATENT DOCUMENTS

| | | | | |
|---|---|---|---|---|
| 2014/0228649 A1* | 8/2014 | Rayner | ................. | G16H 20/30 |
| | | | | 600/301 |
| 2016/0074654 A1* | 3/2016 | Mushahwar | ......... | A61N 1/0484 |
| | | | | 607/48 |
| 2017/0312165 A1* | 11/2017 | Johnson | ................. | A61B 5/021 |
| 2020/0268592 A1* | 8/2020 | Johnson | ................. | A61H 11/00 |

* cited by examiner

SYSTEMS AND METHODS FOR VASCULAR DISEASE PREDICTION, INDICATION, OR DIAGNOSIS

CROSS-REFERENCE TO RELATED APPLICATIONS

This application claims priority to provisional application number U.S. 62/945,025 filed on Dec. 6, 2019 under 35 U.S.C. § 119(e), the disclosure of which is herein incorporated by reference in its entirety.

STATEMENT REGARDING FEDERALLY SPONSORED RESEARCH OR DEVELOPMENT

Not applicable.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light and not as admissions of prior art.

Blood clots are the formation of semisolid masses of proteins and platelets in a particular segment of a vessel. They can occur arterially or venously. An example of a type of blood clot is a venous thromboembolism (VTE). This is a clot that has formed in the venous system.

More specifically, venous thromboembolism (VTE) is a condition characterized by the formation and subsequent embolization of a clot from the vein. A particular example of a VTE is a deep vein thrombosis (DVT) which occurs in the deep venous system. These clots can form anywhere along the vein, but they are especially prevalent near the venous valves. If this clot detaches from the venous walls, it can embolize and travel to the lungs where it causes a condition called pulmonary embolism (PE). The primary clinical approach to addressing patients who have VTE/DVT risk is to inform them of warning signs and symptoms, recommend exercise and compression socks, and, in some patient groups, begin prophylaxis. Despite this, patients continue to experience DVT and VTE. Accordingly, there is a need in the art for novel innovative solutions that allow for quick and easy testing of blood clots, the broader physiological condition.

SUMMARY

According to one implementation of the disclosure, a method for predicting, indicating, or diagnosing vascular disease. The method can include an alignment of the respective one or more recording devices to portions of one or more limbs. The method can further involve, at periodic intervals, obtaining blood flow data from the respective one or more vessels of the one or more limbs. The method can further involve the determination of one or more metrics based on the obtained blood flow data. These metrics can then be used to make a prediction, indication or diagnosis of vascular disease that corresponds to a likelihood of health outcome for the patient.

According to another implementation of the present disclosure, a device comprising of a sleeve containing one or more light emitting diodes and one or more optical sensors to obtain at least one of blood flow data, motion data, muscular contraction, or pressure data. The device can further comprise of a data transmission outlet involving at least one of transmitting the data to a second device or network or storing the data locally, on a second device, or on a network server.

According to another implementation of the present disclosure, a system comprising of a first device configured to obtain and transmit at least one of blood flow, motion, muscular contraction, or pressure data. The system may also contain a second device or server configured to receive the data, determine one or metrics from the data, and generate an output based on the determined one or metrics.

The above-referenced summary section is provided to introduce a selection of concepts in a simplified form that are further described below in the detailed description section. Additional concepts and various other implementations are also described in the detailed description. The summary is not intended to identify key features or essential features of the claimed subject matter, nor is it intended to be used to limit the scope of the claimed subject matter, nor is it intended to limit the number of inventions described herein. Furthermore, the claimed subject matter is not limited to implementations that solve any or all disadvantages noted in any part of this disclosure.

BRIEF DESCRIPTION OF THE DRAWINGS

The present technique(s) will be described further, by way of example, with reference to embodiments thereof as illustrated in the accompanying drawings. It should be understood, however, that the accompanying drawings illustrate only the various implementations described herein and are not meant to limit the scope of various techniques, methods, systems, or apparatuses described herein.

Note that the graphs feature data collection on an 18-year old male with no history of vascular deficiency. The horizontal axis is the number of samples at 97 samples/second while the vertical axis is blood volume in arbitrary absorbance units, with higher values indicating a higher volume of blood flow.

Figure 1:
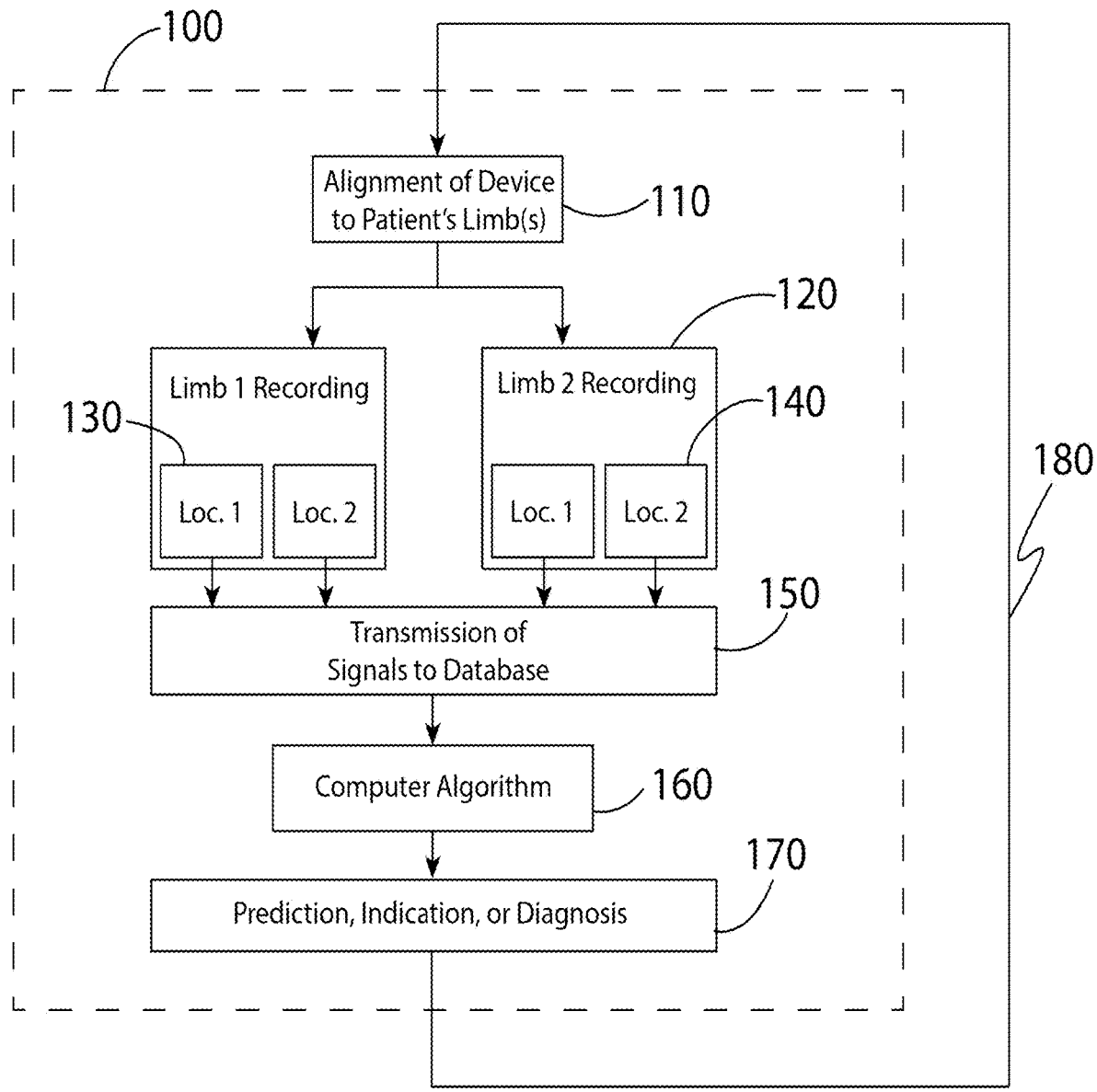
FIG. 1. Illustrates the workflow of the recording device and how data collection, data processing, and data analysis will be conducted, in accordance with implementations of various techniques described herein.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

The formation of clots, for example, venous thromboembolism (VTE), within the cardiovascular system is of particular clinical importance. Clots are characterized by the formation of platelet and protein clusters within blood vessels. More specifically, a VTE is best characterized as a clot formation in the venous system that dislodges from the venous walls and travels through the circulatory system. One particular example of a VTE is a deep vein thrombosis (DVT). This is a clot that initially forms in the deep venous system of the body. The underlying cause of these conditions is the formation of a static clot in the limbs. In the early stages of clot development, the clot hinders blood flow in such a way that it generates turbulence in the blood flow. The particular mechanisms of action for this turbulence generation can vary, but occlusion of the vessel is one common pathway. Note that the remainder of this description describes in certain example implementations, an application to DVTs in the lower limbs, unless otherwise specified, but inventive aspects of the present invention extend to any section of the vasculature, including arterial segments, and any portion of human anatomy, including any other limb or body portion.

Photoplethysmography (PPG) is a way of characterizing blood flow in the vasculature. PPG signals, therefore, are an example of blood flow data. Specifically, PPG data/signal is a representation of blood volume in a vessel over time. PPG signals, therefore, are representative of blood volume over time, a form of blood flow data. The sample implementation discussed in the descriptions below reference PPG signals, but the inventive aspects of the present invention extend to any form of blood flow data.

PPG typically involves the use of electromagnetic light emitted by a light emitting diode (LED) that is placed on the skin such that the light is emitted towards the skin. The light can penetrate the skin and may be absorbed by blood proteins (as well as other tissue and cells)—primarily hemoglobin. Some of the light would be reflected back towards the skin where it can be detected by an optical sensor (e.g., photodiode or phototransistor). This output can be related in a linear fashion to the blood volume in that vessel at any given time.

The current use of PPG in the detection of blood clots is as follows. The patient will typically experience pain or discomfort in a limb, most often the leg. This symptom may be accompanied by swelling or redness in the area. If the attending physician has reason to believe that clot may have formed in the patient's vessels, they will typically request one of several tests to determine the complete diagnosis.

PPG, one of these tests, can typically involve the placement of one of the aforementioned sensors (LED and optical sensor), at a particular location along the limb. For lower limb conditions, the sensor can be placed about 4 inches above the medial malleolus of the ankle. The sensor would be attached to the skin with an adhesive pad that surrounds the sensors. Furthermore, the sensors can be attached via long cables to a separate computer device that processes the signals and produces a visual output for the physician to analyze and assess.

According to research and experimentation associated with the inventive aspects described herein, it is observed that periodic monitoring of PPG signals, and more broadly blood flow data, from a patient at multiple locations along the limb(s) in question can present meaningful insights and diagnostic conclusions about clot formations in the patient's limb(s). Advantageously, schemes and techniques are described herein to enable the collection of such signals in a patient-operated fashion such that there would no longer be a need for a physician, clinician, or technician to be present for PPG signal collection, or more broadly blood flow data collection.

Periodic monitoring may be defined as the use of the data collection method multiple times over the course of the recording device's usage period. This would not require that the recording device be utilized at regular intervals. Rather, it suggests that the recording device can be utilized over a period of time with the intention of utilizing the device more than one time over that period. Advantageously, this can provide the means for analysis of a patient's blood flow at more granular intervals of time which enable a more frequent monitoring system for patients at risk of developing clots. Currently, the use of PPG technology for vascular disease characterization is reserved for use in outpatient and inpatient settings, not for at-home use. As such, the test is only conducted on the patient if the patient experiences symptoms and enters the hospital system or schedules an appointment with their physician. Advantageously, the methods described herein enable a higher monitoring frequency, decreasing the likelihood of negative patient outcomes by identifying clot formation earlier or even prior to the presentation of signs and symptoms.

Systems and methods of the present disclosure enable the prediction, indication, diagnosis of clot formation in a patient's limb(s). Specifically, by collecting signals over a particular usage period and analyzing those signals under a variety of statistical paradigms enables the identification of gradual clot formation. This further can allow for faster diagnosis and decreased time to treatment with the intent of improving patient outcomes.

Referring to FIG. 1, one example flow chart is provided to describe example methods of the present disclosure for the prediction, indication, or diagnosis of vascular disease. The initial step in usage of the recording device (the device) may require the alignment step 110 in which a user (patient) may place the recording device on a prescribed portion of their body (e.g., leg). In one instance, if the patient is prescribed the recording device for usage in multiple limbs, the patient would repeat the procedure for all limbs. In other instances, two or more recording devices may be used. In one example, a respective device may be used for each limb or body portion. In certain implementations, initially, step 110 may also include certain steps such as powering on the device, connecting the device to necessary ports or outlets, logging into a data recording system. Once the device is properly aligned, the device's recording protocol would be initiated, and the method may proceed to the recording step 120. Step 120 involves the collection of PPG signals, and additional sensor data, from the various limbs in question. In certain examples, this step would involve the collection of the aforementioned signals and data from multiple locations within the limbs 130 and 140. In certain implementations, the number of locations or limbs can be increased or decreased to accommodate the patient's particular clinical condition. The data from all of these collected signals can be transmitted to a second device or a network server (e.g., network database) 150. Amongst some implementations of this step 150, data transmission means can include, but are not limited to: cable connection, universal asynchronous receiver/transmitter (UART), Bluetooth (BT), Wi-Fi or other known means. In certain implementations, signal processing (not pictured in FIG. 1), can be done prior to the transmission step 150 or after. The data may be subsequently analyzed in the algorithm step 160 by a computational algorithm described in later sections of this disclosure. Finally, the result of this algorithm, the output, can be a prediction, indication, or diagnosis 170 regarding the patient's vascular disease state.

All of the steps included within the set 100 may describe the events/method steps that occur within one recording session (e.g., daily recording session). For some parts of the analysis described in the latter portions of this disclosure, a temporal analysis (e.g., over predetermined time intervals) can be implemented. As such, the steps included within the set 100 may be repeated on a periodic basis as an iterative process 180.

Figure 2:
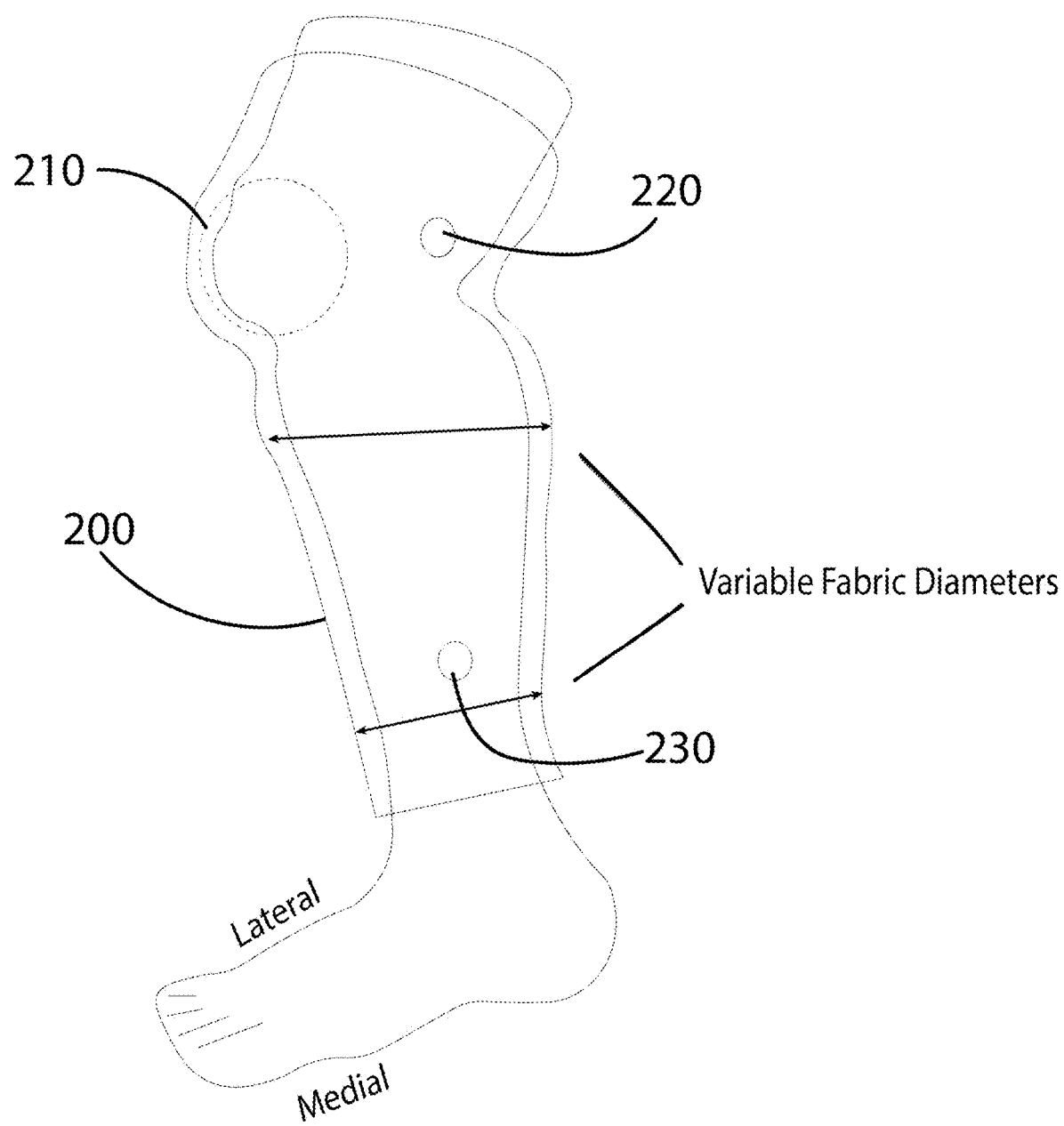
FIG. 2 illustrates a side view of the sleeve on a leg with markings and guiding elements identified in accordance with implementations of various techniques described herein.

Referring to FIG. 2, a sample implementation of the device in the form of a leg sleeve (the sleeve) is depicted. As illustrated, the view presented in this figure is the medial view of a leg. The figure highlights adaptations that enable the translation of PPG technology to the patient-operated, at-home setting.

In certain cases, the conforming material 200 is intended to replace the need for adhesives when utilizing PPG sensors. The use of compressive materials or apparatuses including, but not limited to, stretch fabric, cotton/nylon, tightening Velcro straps, etc. can be used to hold and align PPG sensors and other relevant electronics close to the skin of the body portion of interest. Advantageously, the use of compressive materials further allows for variable sleeve diameter over time and across the length of the sleeve. Ultimately, this extends to the use of any attachment system that can enable conformation of the device(s) to the anatomical structure of the appendage or body part in question.

Advantageously, the use of body conforming materials such as compression fabric that grips the body portion of interest enables would increase accuracy of the PPG signal and reduction of motion artifacts (or signal noise) in the resulting analysis. Furthermore, this use of such material conforms to the patient's appendage diameter over the course of the observation period which automatically corrects for pressure-related changes in blood flow over the course of that period.

The example implementation may also include a series of guiding elements. The implementation utilizes guiding elements that enable for eased usage of the system by a patient. Specifically, these guiding elements may aid in the alignment of the recording device into the appropriate position relative to the target vessels. Examples of such elements include physical alterations of the device embodiment to conform to known human morphological structures. For instance, the use of an opening at the kneecap 210 in a compressive stocking enables easy alignment of sensors embedded within the stocking. Other examples of guiding elements include visible elements such as markings along the compressive material to help with alignment. The guiding elements will be directly aligned with the relevant anatomical structures of interest. For instance, if the system is implemented in the determination of deep vein thrombosis in the lower limbs, a compressive stocking would include markings at the popliteal vein above the kneecap 220 and ~5-10 centimeters above the malleolus of the ankle 230. Other examples of alignment markers include a line marking on the anterior tibial protrusion in order to help the patient align the sleeve around the vertical rotational axis of their leg. Furthermore, alignment structures such as kneecap padding enable the patient/physician to operate the technology with ease and accuracy.

Figure 3:
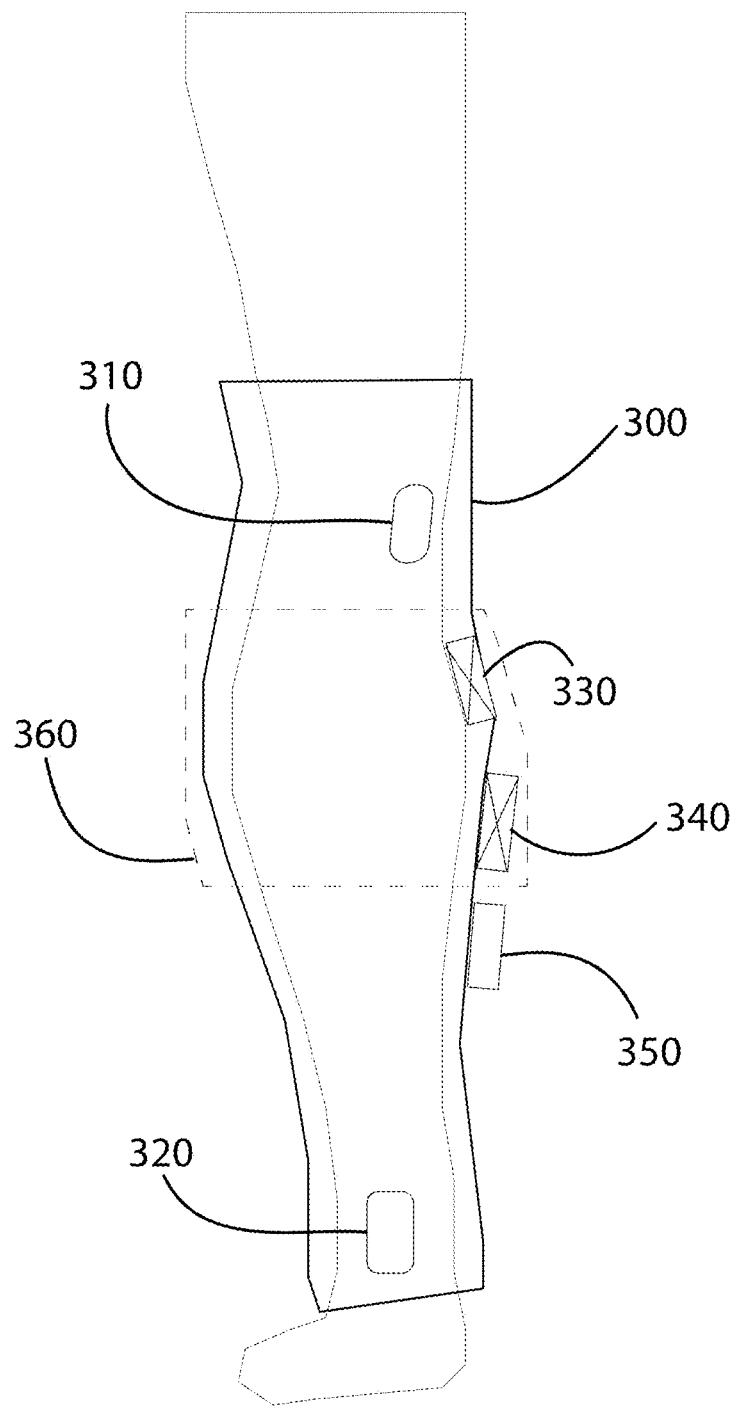
FIG. 3 illustrates a side view of the sleeve on a leg with electronic components and sensors highlighted in accordance with implementations of various techniques described herein.

Referring to FIG. 3, an example implementation of the device's electronic components is presented with the aforementioned compressive/conforming material 300. The device includes a variety of embedded sensors that enable signal collection. The PPG sensor 320 is an embedded PPG sensor that does not require the use of an adhesive pad. The PPG sensor 320 is located at the clinically standard location for vascular disease characterization in the legs—4 inches above the medial malleolus. The PPG sensor 310 is an also an embedded PPG sensor that does not require the use of an adhesive pad. However, this sensor may be located at a clinically novel (in the context of PPG technology and vascular disease characterization) location—the saphenous-popliteal junction—that has been experimentally identified by the inventors as a clinically significant venous juncture. Specifically, the saphenous-popliteal junction presents a unique anatomy at the patient's knee for the aforementioned sensor 310 to detect blood flow in the popliteal vein, a deep vein that runs through the leg. However, there are several issues with collecting PPG signals in this region that have prevented it from being used in practice. First, the veins at this point in the leg are less localized and tend to be larger in diameter. They are also layered under a thicker layer of skin which inhibits accurate signal detection. Advantageously, the use of a wide viewing angle in the phototransistor and/or infrared LED enable the release of infrared light to a wider area, increasing the likelihood that the popliteal vein is captured in the viewing domain. Second, the utilization of a phototransistor as opposed to the standard optimal sensors like photodiodes enables increased signal sensitivity.

In certain implementations, other identified veins of potential clinical significance that have not been previously analyzed with existing PPG technology implementations include:

Saphenous-popliteal junction, which is located below the knee crevice; and

Great saphenous vein at the intersection of the two calf muscle heads on the lateral portion of the leg; and Popliteal vein on the back of the above the knee crevice posterior proximal side of the knee; and Pelvic vein on the anterior side of the groin.

The example implementation may also incorporate additional sensors in order to reduce motion artifacts resulting from ambulatory motions. Specifically, the invention involves the use of additional sensors to inform electrical components and signal analysis. Examples of such sensors include pressure transducers/sensors, motion sensors, 3-dimensional accelerometers, and gyroscopes. Examples that relate to skeletal muscle action are also encompassed within this description. Specifically, the use of electromyography (EMG) sensors, stretch sensors, resistance bands, etc. The inventive aspects further include the integration of such sensors along the interior 330 and exterior 340 of the compression material that inform both hardware elements and signal processing elements of the signal analysis algorithm. The ultimate result (i.e., and output) of this integration is the addition of relevant inputs that aid in the accurate analysis of PPG signals.

Advantageously, the use of motion sensors (i.e., motion data) or muscular contraction activity sensors (i.e., muscular contraction data) 350 can provide meaningful signals relating to the patient's mobility. Temporal alignment of these additional signals and PPG sensors data can inform algorithmic computations and produce more accurate results. For instance, a PPG signal collected while a patient is exercising their calf muscle can be paired with motion or muscular contraction data to determine which time segments along the blood flow data need to be analyzed. Moreover, the use of muscular contraction signals can directly inform the clinical and algorithmic interpretation of PPG signals. For instance, comparing the amplitude and frequency of muscular contraction data to the blood flow data can provide useful insight on venous valve competency. Moreover, the integration of such electromyograph (EMG) sensors with PPG sensors is not done in practice but could provide useful information about the strength of the calf-muscle pump over time (i.e., muscular contraction data). As such, any use of muscular contraction or motion data to inform the analysis of PPG signals for clinical purposes or algorithmic purposes would be encompassed within this invention. Lastly, the integration of these sensors along the interior of the compressive fabric enable the reduction of signal interference from motion in subsequent analysis steps. This can be done through the use of waveform subtraction or other related mathematical tools.

In certain cases, the sensors 330-350 can also be used for artifact reduction purposes. This can be done with greater ease by collecting motion, muscle contraction, or pressure data throughout the recording period in order to remove the effects of these motions and actions from the desired reading. Any usage of the data from these additional sensors to inform hardware components of the medical device are encompassed within this claim. One specific example is the utilization of pressure sensors to account for the variable placement of the sleeve around the leg as well as the variable diameter of a patient's leg or arm over the course of an observation period (several months to years). The integration of pressure sensor/transducer data can enable the normalization of blood flow signals and remove potential confounding variables from the diagnostic analysis. This extends to muscle and motion data as well through the removal of motion-related shifts in infrared light absorption readings (e.g., reflection from the skin surface, shifting of the sleeve, etc.).

The automated pressure cuff system 360 is also depicted in FIG. 3. This system can involve the use of an automatic pressure transduction cuff to stimulate blood flow in a patient at rest. The device has a pressure cuff that automatically inflates after a period of rest during the recording phase and maintains a threshold pressure of (e.g., 120 mm Hg) in the calf region of the leg for a period of time. The pressure may be subsequently released through a voltage-gated control solenoid valve and the patient rests once again. The pressure can also be applied in a cyclical fashion such that the patient undergoes pressure transduction and then rest and then pressure transduction again, etc. for the duration of the recording.

Figure 4:
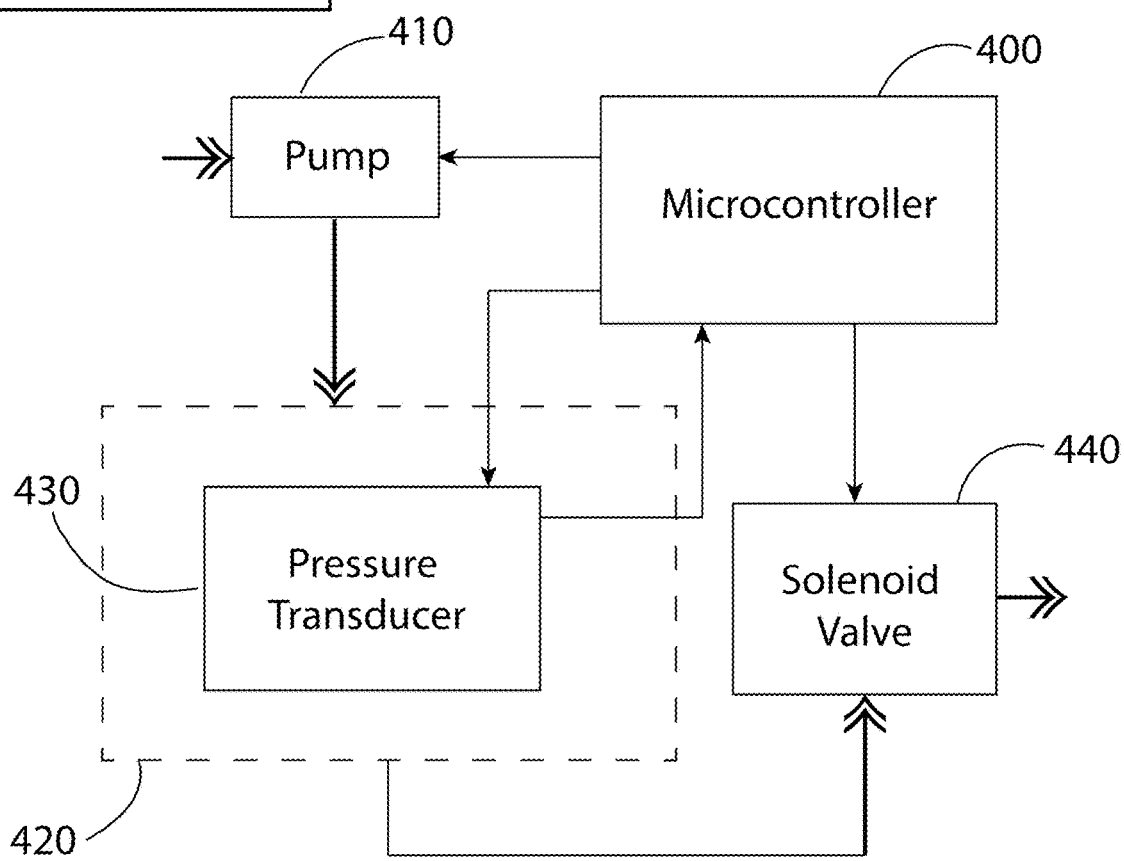
FIG. 4 is a block diagram of the system used for pressure inducement in accordance with implementations of various techniques described herein.

Referring to FIG. 4, a more detailed block diagram of the aforementioned automated pressure cuff system is presented. The components of this system are controlled with an additional microcontroller or with the microcontroller used for the collection of data from the sensors (discussed in below sections of this disclosure). The pump 410 is controlled by the microcontroller and pumps fluid (air) into the inflatable cuff 420 and increase fluid pressure. The pressure transducer 430 may enable feedback to the microcontroller such that the microcontroller can make computational logic-gated decisions to increase, decrease, or maintain fluid pressure at any given point during the recording process. In certain implementations of the pressure transducer 430, pressure sensors such as mechanical sensors on the interior of the cuff or piezoelectric sensors can be used to provide feedback to the microcontroller. The voltage-gated solenoid valve 440 is controlled by the microcontroller and is opened when fluid pressure needs to be reduced.

Figure 5:
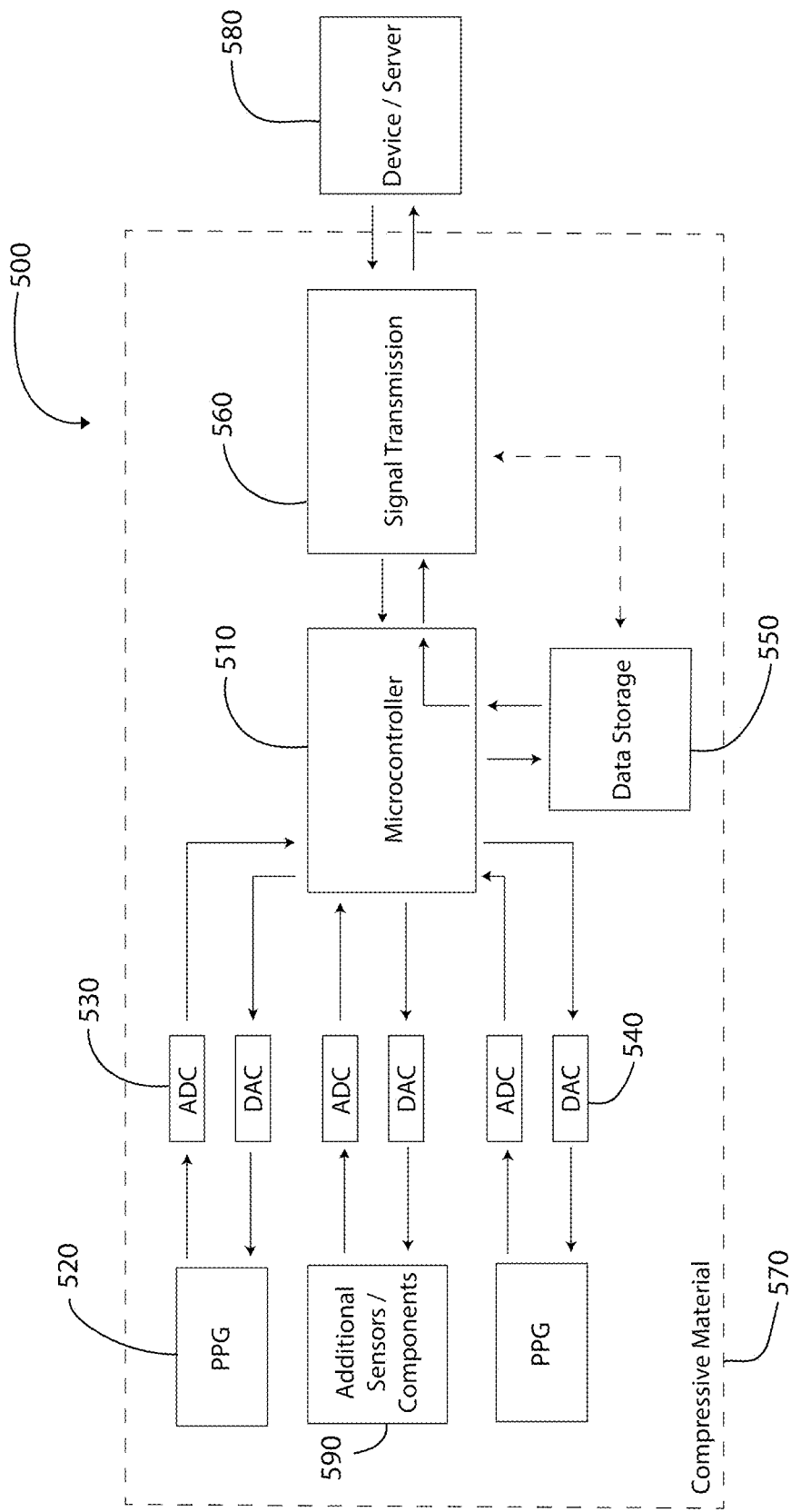
FIG. 5 is a block diagram of the main electronics and sensors embedded in the recording device in accordance with implementations of various techniques described herein.

Referring to FIG. 5, a more detailed block diagram of the electronic components of the device are presented. In certain implementations, the components described within the set 500 are the components that are in the physical device itself. This may comprise of electronic components that may be necessarily connected or attached to the compressive/conforming material 570. In certain cases, a microcontroller 510 is responsible for logic-gated decisions and the control of data and information flow through the system. PPG sensors 520 are shown. These sensors may interact with the microcontroller 510 through analog to digital converters (ADC) 530 and digital to analog converters (DAC) 540. The sensors 520 may comprise of wide-angle near-infrared light emitting diodes (LED) and phototransistors. The ADC 530 converts the analog voltage of the phototransistor into a digital signal that may be interpretable by the microcontroller 510. The DAC 540 can be responsible for controlling voltage directed towards the PPG sensor 520 components.

In some implementations, signal data can be stored on the recording device, on a second device, or a network server (e.g., network database). In the sample implementation, the selected storage means is a local SD card 550. This storage unit or means can subsequently be queried by the microcontroller 510, the second device, or a server-based algorithm to recall data and perform analysis.

In other implementations, data can be transmitted to a second device or a network server transmission can be done through a variety of mechanisms. In certain implementations, this signal transmission component 560 can be through a cable (e.g., UART), Bluetooth, Wi-Fi, or other known transmission means. This data is transmitted to a device or database 580. In certain implementations, the device is a cellular/mobile device or laptop computer. In other implementations, the device may be entirely separate from other multiuse devices and solely operates the device. This data can be sent to a database for storage and future analysis.

Note that what is described as a data transmitting outlet can comprise of the microcontroller, the analog-to-digital converter (ADC), and the selected transmission means or storage means. As such, the data transmitting outlet may have the broader function of accepting, converting/interpreting data, and transmitting or storing of data.

Referring to FIG. 6, a set of analysis paradigms are provided for the analysis of signals collected by the device. Each analysis produces a metric. Each metric is used in the determination of the final output which corresponds to a likelihood of a health outcome associated with a prediction, indication, or diagnosis of vascular disease in the patient.

Figure 6A:
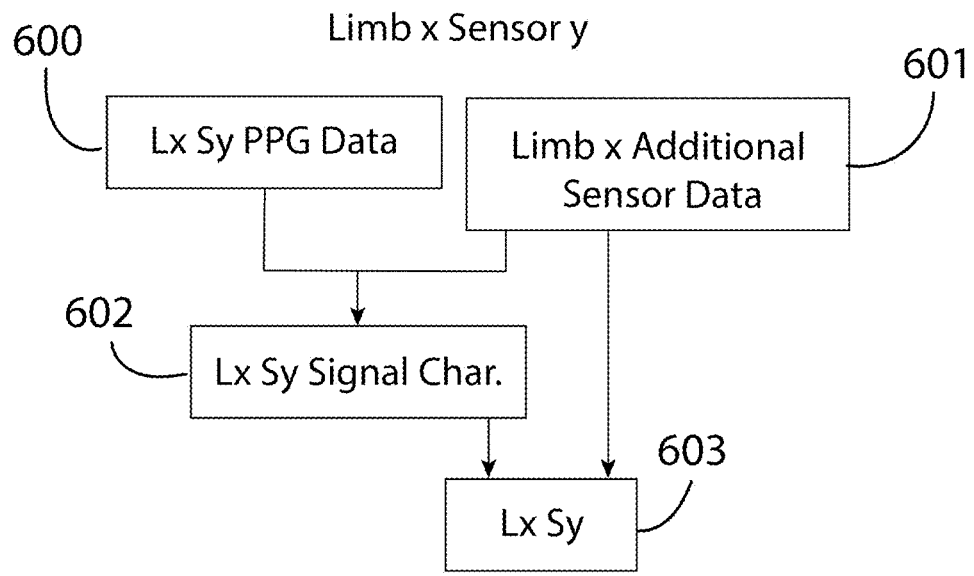
FIG. 6A presents the signal processing component of the analysis steps. It demonstrates the use of PPG signal data and additional sensor data to produce processed data for subsequent analysis.

Referring to FIG. 6A, PPG signal data 600 can be collected from Limb X at Sensor Y. This PPG signal data can be filtered using aforementioned artifact reduction strategies with any additional sensor data from Limb X 601. The immediate metric of this portion of the computation (e.g., algorithm) is a set of signal characteristics 602 that are attributed to Limb X at Sensor Y, henceforth denoted as LX SY. Examples of signal characteristics that can be extracted include, but are not limited to, venous refill time, sustained blood flow time, curve fitting constants for the blood flow data, signal frequency spectra, and maximum and minimum blood flows.

In certain implementations, these signal characteristics, which inform the metrics discussed below, can be defined as follows. Venous refill time can be defined as the time it takes for blood flow levels to return to levels prior to the blood flow stimulation (i.e., exercise-induced or pressure-induced). Sustained blood flow time can be defined as the time after blood flow stimulation ceases for which the blood flow levels remain within a predefined range of values centered about the maximum blood flow value. Curve fitting constants can be defined as the set of coefficient results of one or more statistical regressions (e.g. logistic, linear, polynomial) of the blood flow data. Signal frequency spectra can be defined as the result of a fast Fourier transform (FFT) on the blood flow data or similar known mathematical abstraction (e.g. Laplace transform) to produce a spectrum of frequencies that contains sub-characteristics such as max peak intensity, variance, etc. Finally, maximum and minimum blood flows can be defined as the largest and smallest recorded values for the blood flow data (e.g., blood volume signal) over time, excluding outliers.

The additional sensor data from Limb X and the signal characteristics LX SY can be used to generate a set of values 603 that constitutively represent the original PPG and any additional sensor signals. This set of values are be labeled as "LX SY" 603 in the subsequent subfigures of FIG. 6. For example, "L1 S2" represents the set of values produced by the algorithm in FIG. 6A in Limb 1 at Sensor 2.

Figure 6B:
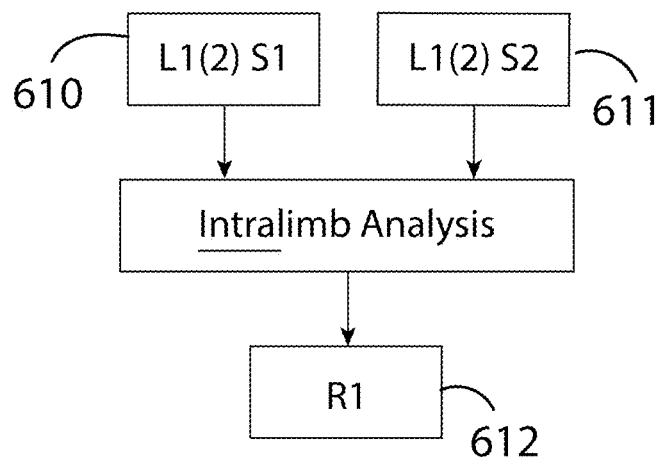
FIG. 6B presents an intralimb analysis that produces results relating to the differences in signal characteristics between PPG data from two different locations in the same limb.

Referring to FIG. 6B, the first analysis, an intralimb analysis, is presented. This analysis is one form of spatial analysis as it makes a comparison between the signal data from two different vascular locations. Two inputs are taken for this analysis: PPG data from one location in the limb 610 and PPG data from a different location in the same limb 611. These two sets of values can be compared with various standard statistical tests. The resulting metric of this analysis (R1) 612 can be subsequently stored and passed on to future analysis. The resulting metric of this intralimb analysis (R1) is particularly useful for the determination of the location of the clot, if present. Assessing the differences in the two signals can present information about the asymmetric impacts of the clot on blood flow in the various areas of the vasculature. For example, a blood clot in the pelvic vein (near the groin) may generate more turbulence and variance in PPG signals collected at the saphenous-popliteal vein (near the knee) than in PPG signals collected at the medial malleolus (near the ankle). This represents a particular implementation involving the algorithmic identification of an approximate location of a diseased vessel region without a separate diagnostic testing. Typically, a separate diagnostic test (e.g., duplex ultrasound) is needed to determine the location of a clot. However, the presented invention may eliminate such a need from the clinical diagnosis procedure utilizing methodologies such as the aforementioned example of algorithmic identification of diseased vessel locations.

Figure 6C:
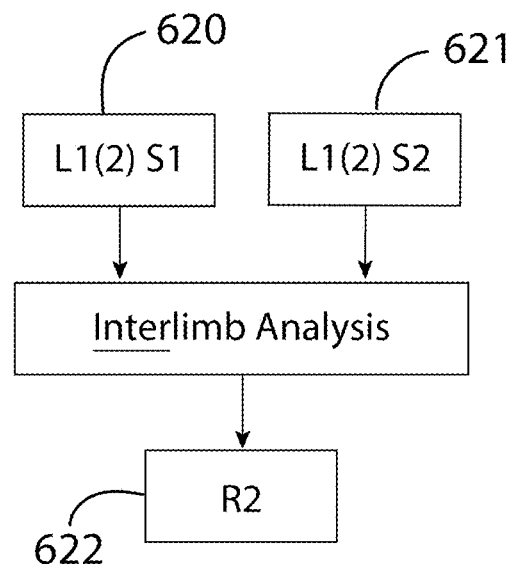
FIG. 6C presents an interlimb analysis that produces results relating to the differences in signal characteristics between PPG data from the same location in two symmetric limbs.

Referring to FIG. 6C, the second analysis, an interlimb analysis, is presented. This analysis is another form of spatial analysis as it makes a comparison between the signal data from two different limbs. Two inputs are taken for this analysis: PPG data from one location in the limb 620 and PPG data from the location in the symmetric limb 621 (e.g., right leg versus left leg). These two sets of values can be compared with various standard statistical tests. The output of this analysis (R2) 622 would be subsequently stored and passed on to future analysis.

Figure 6D:
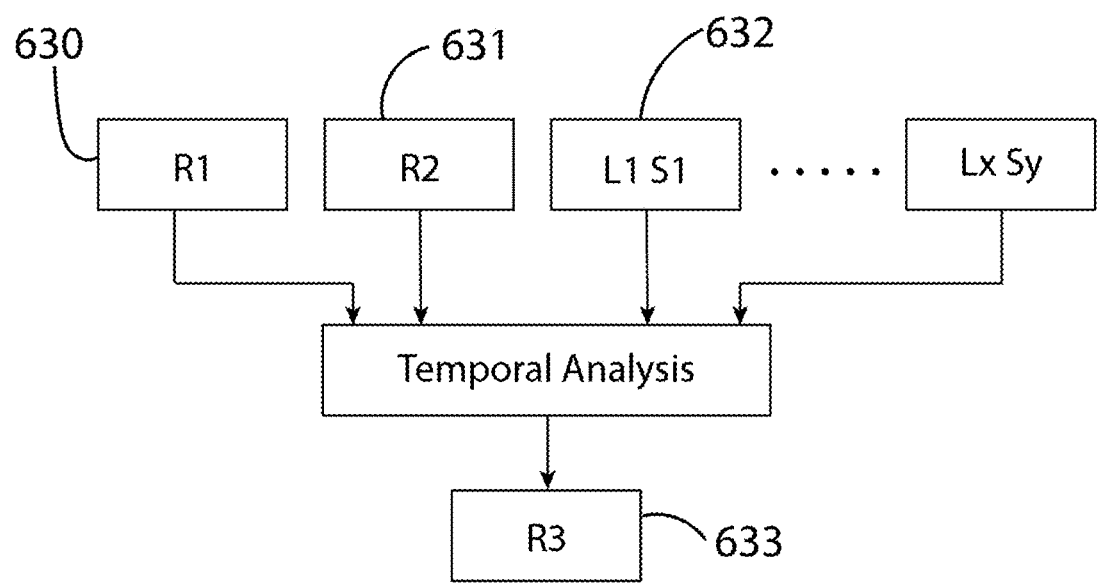
FIG. 6D presents a temporal analysis, over predetermined example time intervals, of the aforementioned results and signal data for a single patient over time to identify trends in signal characteristics.

Referring to FIG. 6D, the third analysis, a temporal analysis, is presented. Several inputs including the results of FIG. 6B (R1) 630 and FIG. 6C (R2) 631 may be incorporated here along with the sets of values 632 resulting from the processed sensor data from FIG. 6A. These values are compared with the historical records of those same values from the patient's previous recording sessions. Statistical tests can be used to produce a metric (R3) 633 that is subsequently stored for future analysis. Specifically, trends in these values over time will be identified through metrics such as curve fitting constants, variance, etc.

In certain implementations, the temporal analysis is one significant aspect to the overall analysis (as described with reference to FIG. 6) as it provides insight onto the progression of clot formation in patients. It is expected that the clot formation would be a gradual process that can alter blood flow dynamics in the vessels over the course of the formation process. Advantageously, the system can analyze each of the signal characteristics and results in a temporal manner by comparing these statistics to all previously recorded data for that patient. In this way, trends in the signal characteristics and secondary results can be identified.

In some implementations, the aforementioned analyses presented in FIG. 6A-6D can be implemented with machine learning algorithms that identify the necessary parameters of the resulting metrics.

Figure 6E:
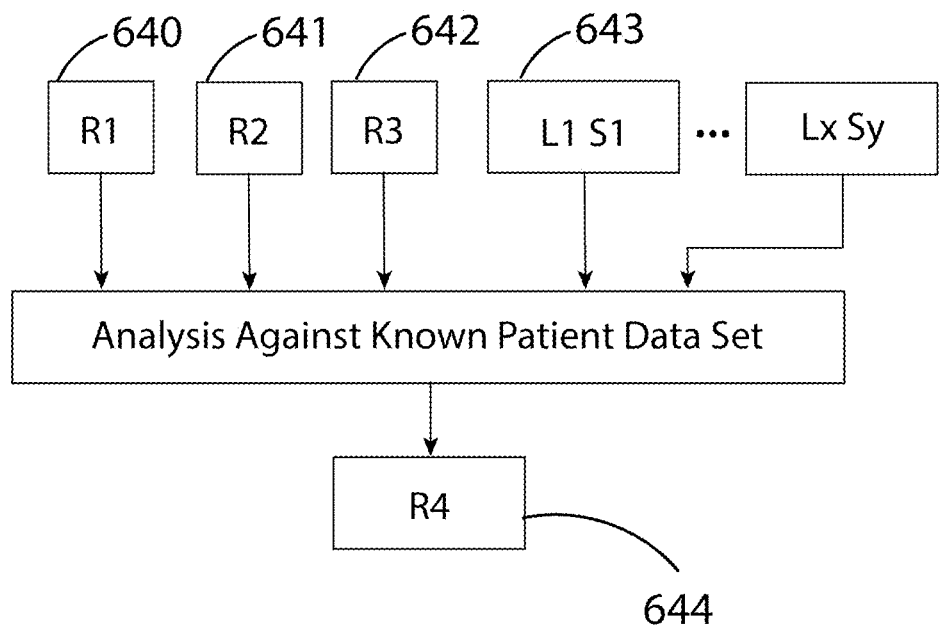
FIG. 6E presents a comparison analysis that assesses differences between the current patient's signal characteristics and a dataset of historically aggregated/recorded data from other patients. Statistical clustering methods are used to characterize the patient against the data in the dataset which is labeled by patient outcomes.

Referring to FIG. 6E, the fourth analysis is presented. This analysis is an example implementation of referential analysis as it compares to a controlled dataset. This analysis takes the resulting metrics from the previous 3 analyses (R1-R3) 640-642 along with the sets of values 643 resulting from the processed sensor data from FIG. 6A and compares them to a database of existing patient data. (i.e., controlled data set). The patient data in this database would include all historical data collected on all patients having utilized the device. Furthermore, the data will be labeled with the known outcomes for these patients (e.g., "unhealthy, clot formation in the popliteal vein"). Specifically, healthy patients are those that have received a negative diagnosis for a vascular disease and unhealthy patients have received a positive diagnosis for a vascular disease. This analysis can largely be driven by statistical analysis, clustering methods, and/or machine learning or neural networking methods that identify the current patient's most likely categorization on the basis of the patient's current recording and temporal trends. The resulting metric of this analysis (R4) 644 will be subsequently stored and passed on to the final analysis.

The algorithmic determination of the aforementioned metrics can be assisted by the use of additional blood flow data or additional signal data including, but not limited to, data from electromyography sensors, stretch sensors, resistance bands, pressure transducers or sensors, motion sensors, three-dimensional accelerometers, and gyroscopes. In certain implementations, the additional blood flow data and additional signal data can be used to reduce motion artifacts from the blood flow data (e.g., PPG signals). In other implementations, those data can be used for determining the relative strength of muscular contractions and the resulting vascular blood flow response.

Figure 6F:
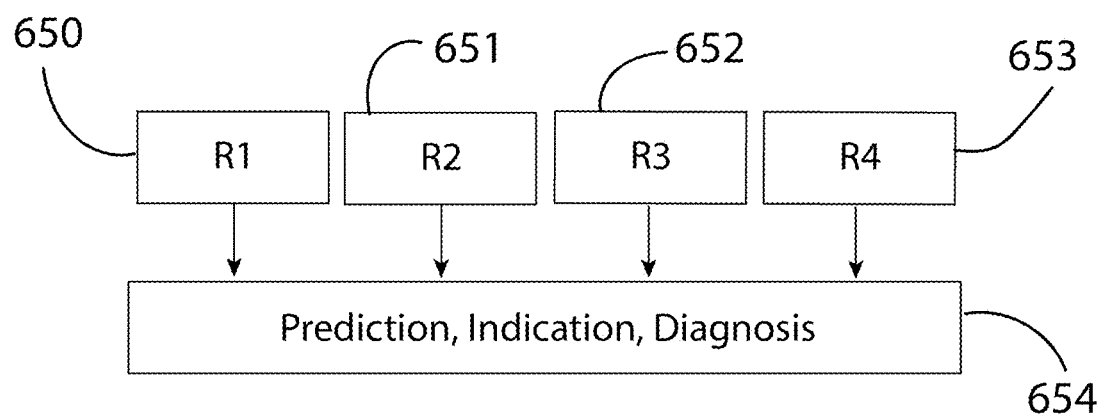
FIG. 6F presents a final analysis that combines previous analyses results to generate a prediction, indication, or diagnosis regarding the patient's vascular condition.

Referring to FIG. 6F, the final stage of analysis is presented. This stage involves a prediction algorithm that incorporates the results of the previous four metrics (R1-R4) 650-653 to generate an output 654 relating to the prediction, indication, or diagnosis of vascular disease. Moreover, this generated output can correspond to a likelihood of a health outcome. This generated output will largely be driven by the use of statistical tests, predetermined thresholds, weighted averages, and machine learning algorithms on one or more of the previously determined metrics. The result of this generated output 654 can directly inform clinical decisions made by the physician and patient.

In certain implementations, the generated output can be reported to the patient, physician, hospital system, or provider. This can result in steps being taken by the patient or relevant caregivers or groups of caregivers in order to reduce the likelihood of a negative patient outcome. In some implementations of this method, the device can provide active feedback to the patient immediately following the prediction, indication, or diagnosis stage to make lifestyle or healthcare modifications in order to reduce likelihood of negative patient outcomes.

Referring to FIG. 6A-F, in certain implementations, the computational analysis, algorithmic determination of the aforementioned metrics can be done on the recording device's microcontroller as opposed to on a network server or a second device.

Referring to FIG. 7-10, the graphs feature data collection on an 18-year old male with no history of vascular deficiency. The horizontal axis is the number of samples (sampled at 97 samples/second) while the vertical axis is normalized blood volume recorded in arbitrary absorbance units, with higher values indicating a higher volume of blood flow.

Figure 7A:
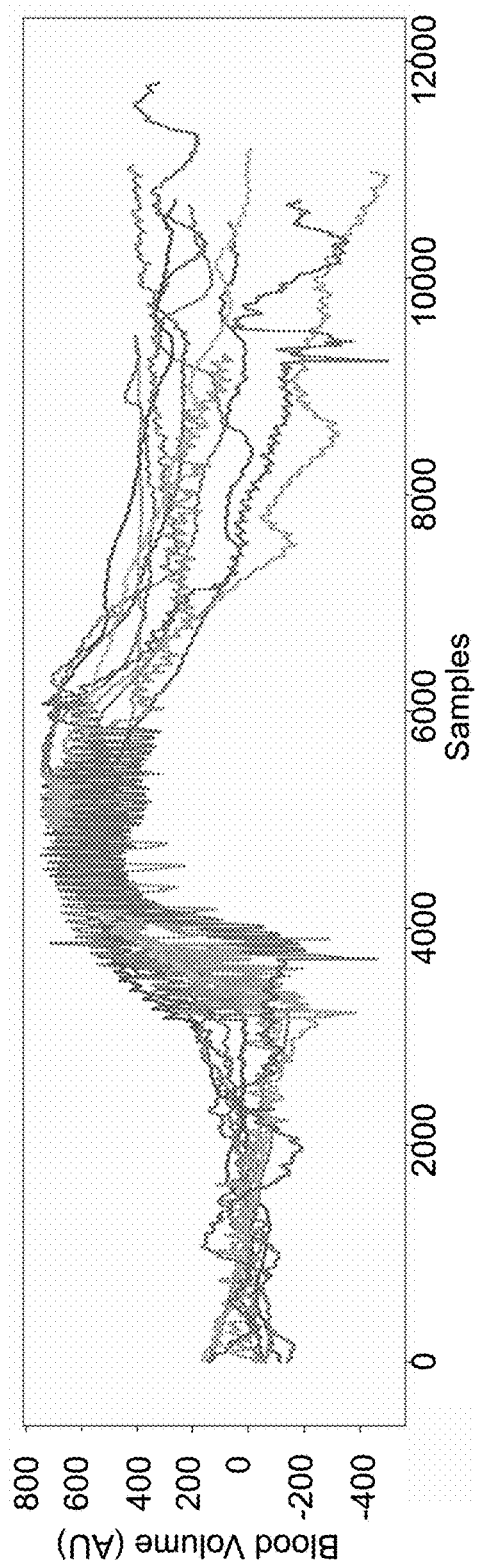
FIG. 7A displays data from the left leg. The data was taken at the saphenous-popliteal junction. There is an initial resting period of ~30 seconds, followed by ~20 seconds of seated dorsiflexion, and then rest. The data indicates that the recording device detects blood volume change from the increased venous return, and also detects the gradual decrease in volume as the user stops exercising.
Figure 7B:
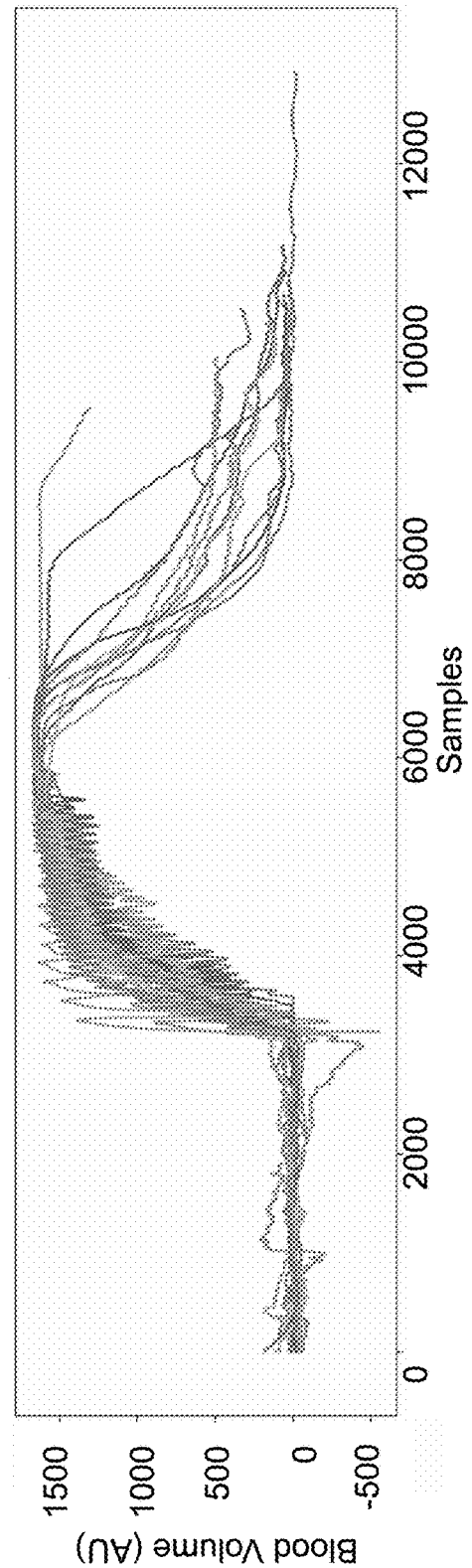
FIG. 7B displays data from the right leg. The data was taken at the saphenous-popliteal junction. In both subgraphs, there is an initial resting period of ~30 seconds, followed by ~20 seconds of seated dorsiflexion, and then rest. The data indicates that the recording device detects blood volume change from the increased venous return, and also detects the gradual decrease in volume as the user stops exercising.

Referring to FIG. 7, sample data collected over a period of time is presented. The patient underwent a period of rest, for approximately 60 seconds and then proceeded to conduct dorsiflexion for 20 seconds (at an approximate rate of 1 flexion per second). The patient then rested for an additional 90 seconds. FIG. 7A depicts the left leg of the patient at the saphenous-popliteal junction while FIG. 7B depicts recordings from the right leg at the same location.

FIG. 7 highlights the raw inputs for the previously discussed analyses. Data is collected for multiple limbs and can be compared (between the two graphs). The data can also be analyzed temporally by analyzing the graphs contained within FIG. 7A or FIG. 7B alone.

Figure 8:
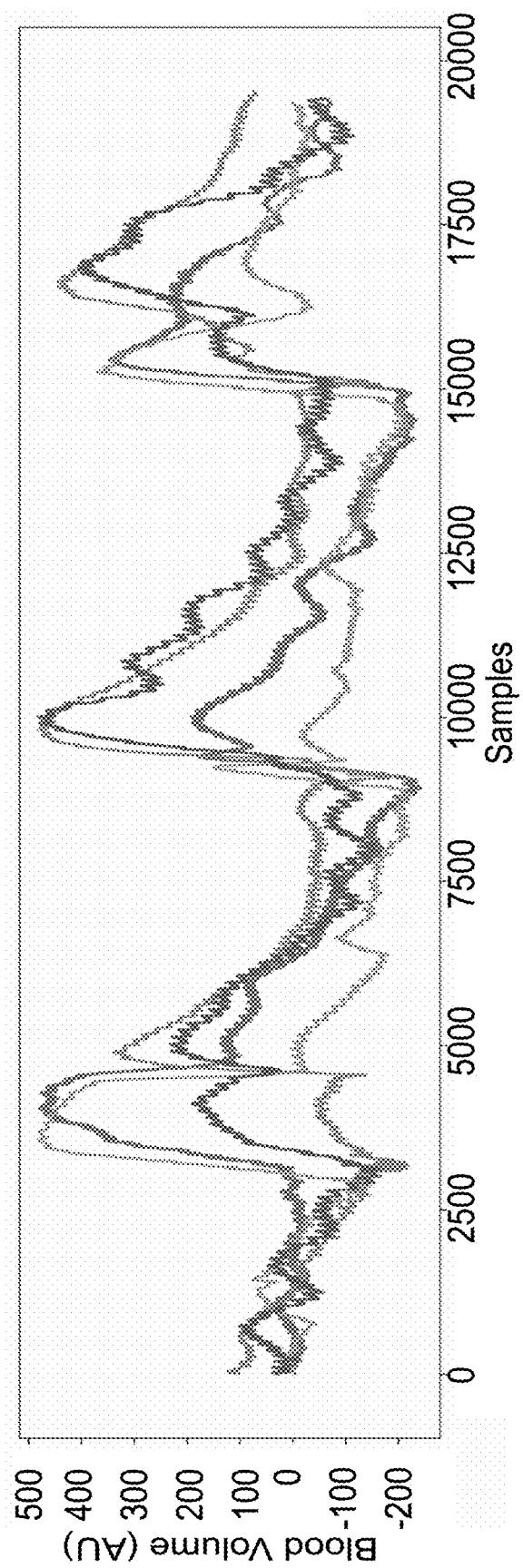
FIG. 8 displays data taken from the right leg at the saphenous-popliteal junction. The first peak results from an introduction of 120 mmHg of pressure, with an immediate release, while the following two peaks result from a gradual release after an introduction of 120 mmHg and 60 mmHg, respectively. Here, the increased venous return from the introduction of pressure is clearly displayed and is consistent with pressure change and duration of pressure release.

Referring to FIG. 8, sample data of the patient's right leg undergoing automatic pressure transduction blood flow stimulation. The purpose of this figure it to demonstrate the signals that result from the aforementioned pressure transduction system. Advantageously, there is significantly more control over the resulting signal allowing for future modification of the pressure cycles. Second, the method of challenging the venous system through pressure allows for complete or near complete occlusion of the vessels in question which allows for more venous blood flow return to be captured within the resulting signal.

Figure 9A:
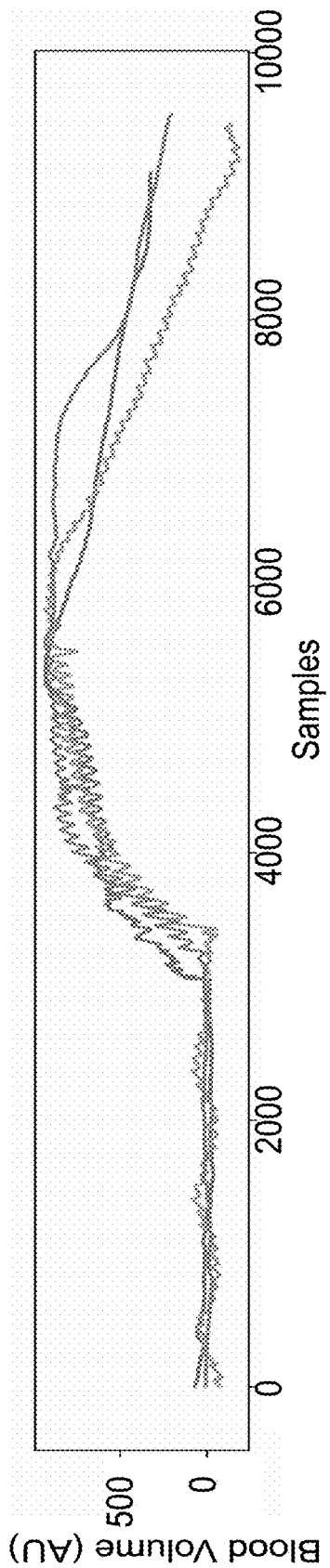
FIG. 9A displays data from the right leg saphenous-popliteal junction. The distinct characteristics of the signals in either location provide metrics for analysis.

Referring to FIG. 9, signals from the right leg of the patient may be provided at two locations along the leg. FIG.

Figure 9B:
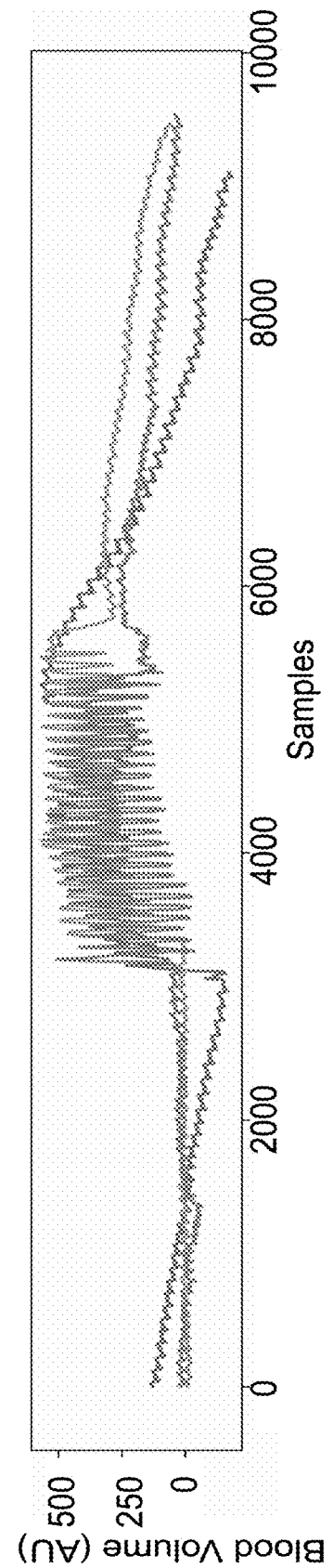
FIG. 9B displays data from the right leg, ~4 inches above the medial malleolus. The distinct characteristics of the signals in either location provide metrics for analysis.
Figure 10A:
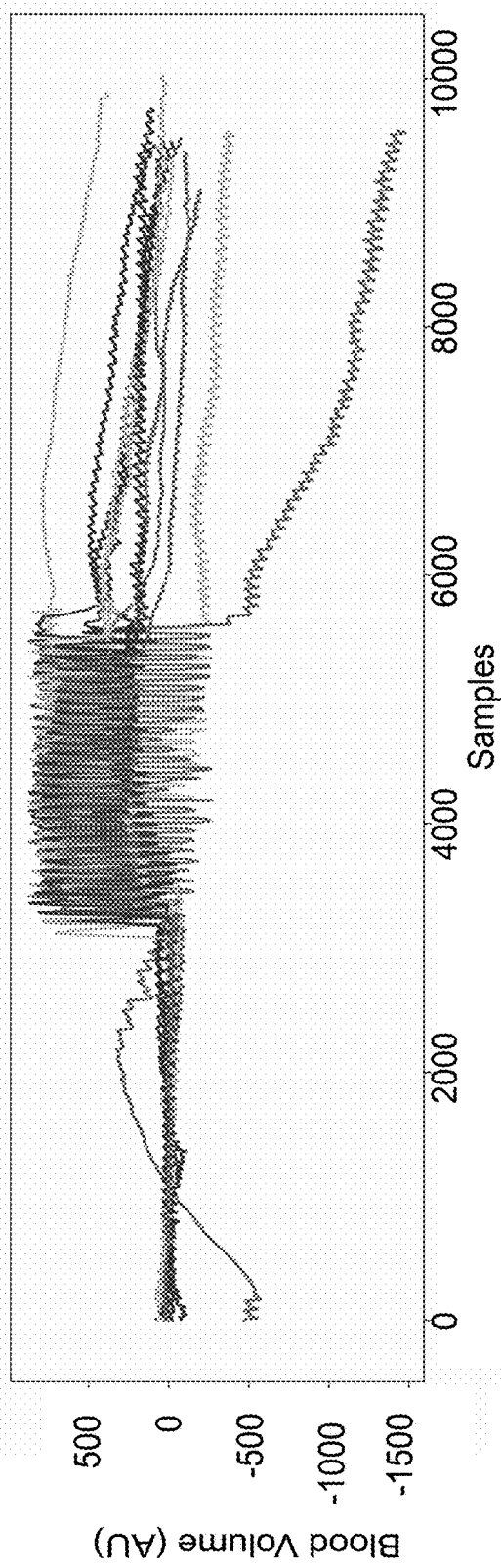
FIG. 10A displays data from the right leg saphenous-popliteal junction. A point pressure was introduced throughout the duration of the recording. The introduction of point pressure (meant to simulate clotting or venous deficiency), clearly affects venous return flow and causes abnormalities. Point pressure was introduced in likely areas of DVT formation: the pelvis (groin), upper leg (thigh), and lower leg (calf). The algorithm can differentially diagnose healthy and abnormal blood flow as well as location, optionally.
Figure 10B:
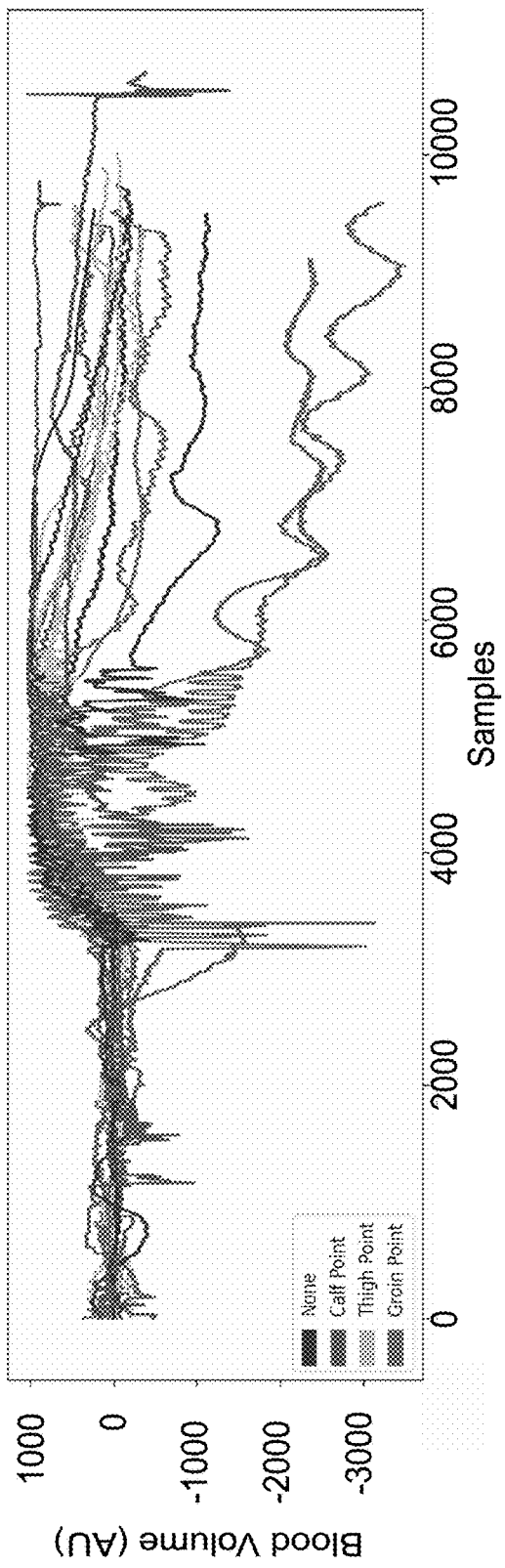
FIG. 10B displays data from the right leg, ~4 inches above the medial malleolus. The introduction of point pressure (meant to simulate clotting or venous deficiency), clearly affects venous return flow and causes abnormalities. Point pressure was introduced in likely areas of DVT formation: the pelvis (groin), upper leg (thigh), and lower leg (calf). The algorithm can differentially diagnose healthy and abnormal blood flow as well as location, optionally.

9A depicts the PPG signal from the saphenous-popliteal junction while FIG. 9B depicts the PPG signal from about 4 inches above the medial malleolus. The primary purpose of FIG. 9 is to highlight the raw inputs for the previously discussed analyses. Data can be collected for multiple locations within the same limb (intralimb analysis) and can be compared between the two graphs.

Figure 11:
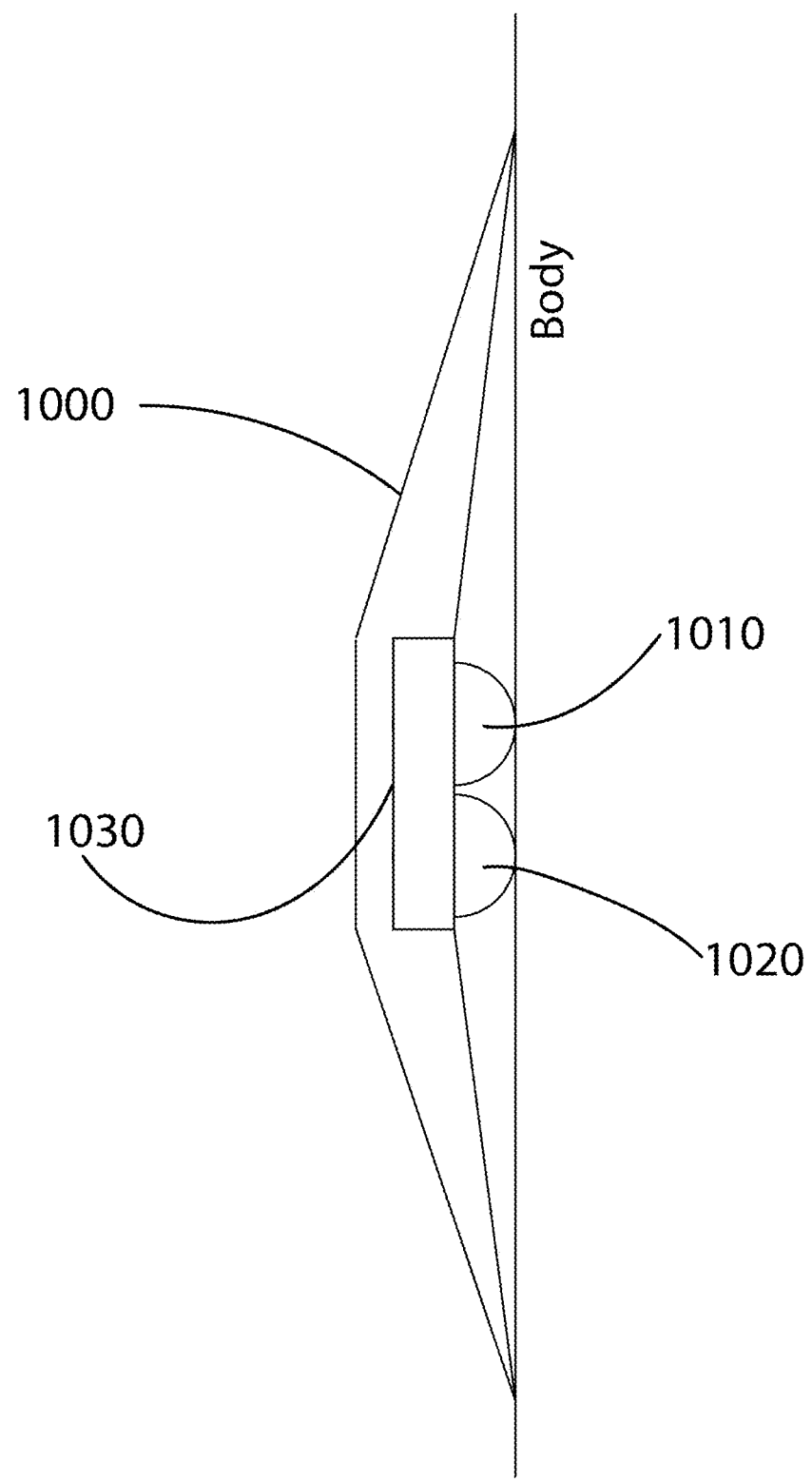
FIG. 11 illustrates a cross-section side view of how electronics and sensors will be embedded in the sleeve in accordance with implementations of various techniques described herein.

Referring to FIG. 11, a depiction of the embedded sensors is presented. As shown, the compressive material 1000 is shown with continuation above and below the sensors. Note that the example implementation demonstrates the use of a PPG sensor which comprises of the LED and optical sensor. In certain cases, the light-emitting diode (LED) 1010 may emit near-infrared light, may have a wide viewing angle, and may be positioned such that it is directly adjacent to and at close distance to the optical sensor (e.g., photodiode or phototransistor) 1020 which will receive reflected light from the patient's blood vessels and tissue. Both of the LED 1010 and the optical sensor 1020 can be placed such that they directly contact the skin on the limb in question. Finally, a printed circuit board 1030 is embedded within fabric and serves as the medium between the compressive material and the PPG sensor components (which are fastened via soldering to the board). The immediate signal output of the optical sensor can be an analog signal or digital signal.

In certain implementations, the board itself may be fastened to the compressive material through the use of string that passes through the compressive material and over or through holes in the board. Alternatively, Velcro straps or strips can be used to fasten the PPG sensor and board to the fabric and hold it to the skin.

Computer-readable program instructions described herein can be downloaded to respective computing/processing devices from a computer-readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device. In certain implementations secure shell (SSH) connection to external servers or direct upload via USB cables can be done.

Computer-readable program instructions for carrying out operations of the present disclosure may be assembler instructions, instruction-set-architecture (ISA) instructions, machine instructions, machine-dependent instructions, microcode, firmware instructions, state-setting data, or either source code or object code written in any combination of one or more programming languages, including an object-oriented programming language such as, Smalltalk, C++ or Python, and procedural programming languages, such as the "C" programming language. The computer-readable program instructions may execute entirely on the device and partly on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), electromyography (EMG) sensors, pressure transducers, muscle sensors, gyroscopes, accelerometers, or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to the analysis flowchart (FIG. 6) and/or block diagrams of methods, apparatus (systems), and computer program products according to embodiments of the disclosure. It will be understood that each block of the analysis flowchart, and combinations of blocks in the analysis flowchart, can be implemented by computer-readable program instructions. It will be understood that certain blocks of the block diagrams (FIGS. 1, 4, and 5), and combinations of blocks in the block diagrams, can be implemented by computer-readable program instructions.

These computer-readable program instructions may be provided to a processor of a general-purpose computer, a special purpose computer, a microcontroller, or other programmable data processing apparatus to produce a machine, such that the instructions, which executes via the processor of the computer or other programmable data processing apparatus. The machine is an example of means for implementing the functions/acts specified in the analysis flowchart and/or block diagrams. The computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement one of more aspects of the functions/acts specified in the analysis flowchart and/or block diagrams.

The computer-readable program instructions may also be loaded onto a computer, other programmable data processing apparatus, or other device to cause a series of operational steps to be performed on the computer, other programmable apparatus or other device to perform a computer implemented process, such that the instructions which execute on the computer, other programmable apparatus, or other device implement one or more functions/acts specified in the flowchart and/or block diagrams.

The flowchart and block diagrams in the Figures illustrate the architecture, functionality, and operation of possible implementations of systems, methods, and computer program products according to various implementations of the present disclosure. In this regard, each block in the flowchart or block diagrams may represent a module, segment, or portion of instructions, which comprises one or more executable instructions for implementing the specified logical function(s). In some alternative implementations, the functions noted in a block in a diagram may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts or carry out combinations of special purpose hardware and computer instructions.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first", "second", etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

Illustrative, non-exhaustive examples, which may or may not be claimed, of the subject matter according to the present disclosure are provided below. Different examples of the device(s) and method(s) disclosed herein include a variety of components, features, and functionalities. It should be understood that the various examples of the device(s) and method(s) disclosed herein may include any of the components, features, and functionalities of any of the other examples of the device(s) and method(s) disclosed herein in any combination, and all of such possibilities are intended to be within the scope of the present disclosure. Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A method comprising:
aligning respective one or more recording devices to portions of one or more limbs, wherein the one or more recording devices comprise one or more photoplethysmography (PPG) sensors integrated into a sleeve fitted on the one or more limbs;
at distinct recording sessions over an observation period, obtaining, by the one or more PPG sensors, blood flow data from respective one or more vessels of the one or more limbs, wherein each of the recording sessions are performed for a fixed duration of a rest period and an exercise period at unfixed time intervals, and
determining, by a computing device, one or more metrics based on the obtained blood flow data.

2. The method of claim 1, wherein:
the rest period comprises first and second rest periods;
the first rest period is before the exercise period and the second rest period is after the exercise period;
the first rest period provides one or more baseline values for a comparison of the recording sessions;
the blood flow data is obtained in response to a controlled-exercise stimulus, wherein the controlled-exercise stimulus is provided during the exercise period; and
the one or more metrics is based upon sustained blood flow time, wherein the one or more metrics are determined during the second rest period.

3. The method of claim 1, wherein:
the one or more metrics is based upon curve fitting constants for the blood flow data;
the curve fitting constants correspond to venous blood flow return in response to a dorsiflexion;
the rest period comprises first and second rest periods;
the first rest period is before the exercise period and the second rest period is after the exercise period; and
the venous blood flow return occurs during the second rest period.

4. The method of claim 1, wherein the method further comprises:
generating a time series of data of a patient, wherein:
the rest period comprises first and second rest periods;
the first rest period is before the exercise period and the second rest period is after the exercise period;
the first rest period provides one or more baseline values for a comparison of the recording sessions; and
comparing data of respective second rest periods of the recording sessions to the one or more baseline values of the respective first rest periods of the recording sessions, wherein:
the times series comprises data corresponding to the respective second rest periods of the recording sessions taken over the observation period by the patient, wherein the observation period is a minimum of at least two or more days.

5. The method of claim 1, wherein the aligning of the recording device further comprises:
positioning guiding elements to the one or more limbs, wherein the guiding elements comprises at least one of markings, cutouts, or physical alterations, wherein the aligning of the respective one or more recording devices via the positioned guiding elements and the obtaining of blood flow data are performed solely by a patient.

6. The method for claim 1, wherein the obtaining of blood flow data from the respective one or more vessels comprise a measurement of blood flow data over the recording sessions at a pelvic vein.

7. The method for claim 1, further comprising:
transmitting the obtained blood flow data from the one or more recording devices to the computing device or a server; and
storing the obtained blood flow data or the determined one or more metrics in the computing device or a server after the distinct recording sessions over the observation period;
processing, by the computing device or the server, the stored blood flow data; and
outputting the processed data to a patient, wherein the processed data corresponds to prophylactic treatments configured to prevent a formation of DVT or pulmonary embolism.

8. The method of claim 1, wherein the determining of one or more the metrics comprises:

evaluating data received from the one or more PPG sensors and one or more of: electromyography sensors, stretch sensors, resistance bands, pressure transducers or sensors, motion sensors, three-dimensional accelerometers, and gyroscopes.

9. The method of claim 8, wherein the evaluation of data further comprises:
producing artifact-reduced blood flow data through elimination of one or more signal components related to variable device pressure along the skin or muscle contraction.

10. The method of claim 8, wherein the evaluation of the data further comprises of: characterizing a blood flow response to a plurality of muscle contractions from a determination of strength and duration of the plurality of muscle contractions over the exercise period.

11. The method of claim 1, further comprising:
generating an output corresponding to a likelihood of a health outcome based at least partially on the one or more metrics and a controlled data set, wherein the health outcome corresponds to a prediction, an indication, or a diagnosis related to vascular disease in a patient.

12. The method for claim 11, wherein the generated output is based at least partially on the one or more metrics and a controlled data set, wherein the controlled data set comprises:
historical healthy and unhealthy group patient data for classification of a status of the patient, wherein the healthy patient data corresponds to respective negative diagnoses for vascular diseases of one or more different healthy patients, and wherein the unhealthy patient data corresponds to respective positive diagnoses for vascular disease of one or more different unhealthy patients.

13. The method for claim 11, wherein the one or more metrics comprises of a spatial analysis involving one or more of the following:
providing a first differential analysis of signal statistics from two or more limbs of a patient; or
providing a second differential analysis of signal statistics from two or more vessel locations within one of the one or more limbs of the patient.

14. The method for claim 1, further comprising:
generating an output corresponding to an approximate location of a diseased vessel region by determining at least one signal asymmetry between two or more sensors.

15. The method for claim 1, wherein the one or more metrics comprises a temporal analysis, wherein performing the temporal analysis comprises:
performing one or more computations corresponding to statistical tests of the obtained blood flow data and the one or more metrics over the observation period, wherein:
one or more of the statistical clustering methods and statistical regressions of the statistical tests correspond to an alteration of a venous blood flow of the one or more limbs.

16. A device comprising:
a sleeve comprising of sensors configured to obtain at least one of blood flow, motion, muscular contraction, or pressure data from veins in one or more legs, wherein the sleeve is configured to automatically correct pressure-related changes of the data between each of the sensors and the one or more legs at different recording sessions for a fixed duration of a rest period and an exercise period at unfixed time intervals during an observation period, and
a data transmitting outlet configured to receive the data, and at least one of transmit the data to a second device or a network server, or store the data to either the device, a second device, or a network server.

17. The device of claim 16, wherein:
the rest period comprises first and second rest periods;
the first rest period is before the exercise period and the second rest period is after the exercise period;
the first rest period provides one or more baseline values for a comparison of the recording sessions; and
the data transmitting outlet further comprises:
an analog-to-digital (ADC) converter; and
a microcontroller configured to receive the data from the ADC and output the data.

18. The device of claim 16, wherein the sensors of the sleeve include at least one light emitting diode and at least one optical sensor configured to obtain blood flow data.

19. A system comprising:
a first device configured to obtain and transmit at least one of blood flow, motion, muscular contraction, or pressure data, wherein:
the first device obtains the data from respective one or more vessels of the one or more limbs at different recording sessions over an observation period in response to a controlled-exercise stimulus;
each of the different recording sessions are performed for a fixed duration of a rest period and an exercise period at unfixed time intervals; and
the observation period is a minimum of at least two or more days; and
a second device or server configured to receive the data, determine one or metrics from the data, and generate an output based on the determined one or metrics.

* * * * *